(12) United States Patent
Yang et al.

(10) Patent No.: US 10,665,830 B2
(45) Date of Patent: May 26, 2020

(54) BATTERY PACK HAVING LOWER CASE OF SMALL THICKNESS AND LAPTOP COMPUTER INCLUDING THE SAME

(71) Applicant: LG CHEM, LTD., Seoul (KR)

(72) Inventors: Jin Oh Yang, Daejeon (KR); Suk Jin Song, Daejeon (KR); Suk Hoon Lee, Daejeon (KR); Yeon Ok Yi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 173 days.

(21) Appl. No.: 15/555,250

(22) PCT Filed: Oct. 27, 2016

(86) PCT No.: PCT/KR2016/012181
§ 371 (c)(1),
(2) Date: Sep. 1, 2017

(87) PCT Pub. No.: WO2017/074068
PCT Pub. Date: May 4, 2017

(65) Prior Publication Data
US 2018/0019453 A1    Jan. 18, 2018

(30) Foreign Application Priority Data
Oct. 29, 2015  (KR) .......................... 10-2015-0151078

(51) Int. Cl.
*H01M 2/10* (2006.01)
*G06F 1/16* (2006.01)

(52) U.S. Cl.
CPC ............ *H01M 2/1022* (2013.01); *G06F 1/16* (2013.01); *G06F 1/1635* (2013.01);
(Continued)

(58) Field of Classification Search
CPC ............. H01M 2/1022; H01M 2/1061; H01M 2/1094; G06F 1/16; G06F 1/1635
(Continued)

(56) References Cited

U.S. PATENT DOCUMENTS 6,225,778 B1 * 5/2001 Hayama .............. H01M 2/1061
320/112
2005/0164080 A1 * 7/2005 Kozu .................... H01M 2/105
429/176
(Continued)

FOREIGN PATENT DOCUMENTS

JP          2002-93470 A       3/2002
JP          2002093470 A   *   3/2002
(Continued)

OTHER PUBLICATIONS

European Search Report for Appl. No. 16860251.4 dated Jul. 19, 2018.
(Continued)

*Primary Examiner* — Sean P Cullen
(74) *Attorney, Agent, or Firm* — Birch, Stewart, Kolasch & Birch, LLP

(57) ABSTRACT

A battery pack that is mounted to a laptop computer, wherein two or more battery cells that can be charged and discharged are housed in a pack case; the battery cells are cylindrical battery cells having a circular vertical cross-section; the pack case is configured with a lower case in which battery cells are received and an upper case that is coupled to the lower case in order to close and seal the battery cells; in the upper case, a thickness of an upper contact point portion that contacts an upper end external circumferential surface of the battery cells is 70% or less of that of the remaining portions of the upper case, and a first sheet is attached to an outer surface of the upper case corresponding to the upper contact point portion; and in the lower case, a thickness of a lower
(Continued)

contact point portion that contacts a lower end external circumferential surface of the battery cells is 70% or less of that of the remaining portions of the lower case, and a second sheet is attached to an outer surface of the lower case corresponding to the lower contact point portion.

19 Claims, 6 Drawing Sheets

(52) U.S. Cl.
CPC ....... *H01M 2/1061* (2013.01); *H01M 2/1094* (2013.01); *H01M 2220/30* (2013.01)

(58) Field of Classification Search
USPC ........................................ 429/156, 159, 163
See application file for complete search history.

(56) References Cited

U.S. PATENT DOCUMENTS

| | | |
|---|---|---|
| 2006/0210866 A1 | 9/2006 | Horii et al. |
| 2008/0081254 A1 | 4/2008 | Kim et al. |
| 2009/0148754 A1* | 6/2009 | Marchio ............. H01M 2/1077 429/83 |
| 2009/0169980 A1 | 7/2009 | Goto |
| 2010/0178548 A1 | 7/2010 | Baek |
| 2012/0121969 A1 | 5/2012 | Takemura et al. |
| 2014/0072831 A1 | 3/2014 | Wang et al. |
| 2015/0118529 A1 | 4/2015 | Ahn |
| 2016/0285060 A1 | 9/2016 | Okuda et al. |

FOREIGN PATENT DOCUMENTS

| | | | |
|---|---|---|---|
| JP | 2006-156049 A | | 6/2006 |
| JP | 2008-235144 A | | 10/2008 |
| JP | 2010-44954 A | | 2/2010 |
| JP | 2011-181428 A | | 9/2011 |
| JP | 2011181574 A | * | 9/2011 |
| JP | 2014-53170 A | | 3/2014 |
| JP | 2014053170 A | * | 3/2014 |
| JP | 2015-95277 A | | 5/2015 |
| KR | 2002-100333 A | | 4/2002 |
| KR | 10-2008-0029287 A | | 4/2008 |
| KR | 10-2009-0110471 A | | 10/2009 |
| KR | 10-2010-0083725 A | | 7/2010 |
| KR | 10-2012-0025614 A | | 3/2012 |
| KR | 10-2014-0035205 A | | 3/2014 |

OTHER PUBLICATIONS

International Search Report issued in PCT/KR2016/012181 (PCT/ISA/210), dated Mar. 13, 2017.

* cited by examiner

BATTERY PACK HAVING LOWER CASE OF SMALL THICKNESS AND LAPTOP COMPUTER INCLUDING THE SAME

TECHNICAL FIELD

This application claims the benefit of Korean Patent Application No. 10-2015-0151078 on Oct. 29, 2015 with the Korean Intellectual Property Office, the disclosure of which is herein incorporated by reference in its entirety.

The present invention relates to a battery pack that is mounted to a laptop computer, and more particularly, to a battery pack and a laptop computer including the same in which a thickness of a lower contact point portion that contacts a lower end external circumferential surface is small in a lower case in which battery cells are housed.

BACKGROUND ART

With technical development of mobile devices, a laptop computer that can exhibit a performance corresponding to a desktop computer is provided, and nowadays, there is very high demand for the laptop computer.

The laptop computer has a maximum merit of convenient portability, compared with an existing desktop computer, and one of factors that enable such portability is a battery pack, which is an energy source of the laptop computer.

In general, a battery pack of a laptop computer is configured with a plurality of unit battery cells and a pack case that houses the battery cells, and particularly, as a rechargeable battery that is used for a device such as the laptop computer, a cylindrical battery cell of high power and a large capacity is generally used.

The rechargeable battery is generally classified into a hard pack and an inner pack according to a form of a battery pack that is mounted to a case. Because the hard pack forms a portion of an external form of an external device in which the hard pack is mounted, the hard pack has a merit that may be easily mounted to the external device upon using, but in a state in which a battery cell is housed, a case should be designed according to a kind of a corresponding external device and thus there is a problem that the hard pack is relatively expensive and has less compatibility.

In electronic products such as a laptop computer, consumers request a light weight and a small thickness of the product. Therefore, according to a current trend requiring a thin and light laptop computer, a hard pack that is used for the laptop computer is also formed in a thin thickness.

Accordingly, in order to prevent an appearance failure such as a sink mark and a stress mark that may have because of a characteristic of an injection material constituting a pack case, a basic thickness of the injection material should be maintained to 1 mm. However, such a requirement may operate as a fault factor in a thin thickness of the foregoing battery pack.

Therefore, in order to correspond to a consumer's demand, it is necessary to design a battery pack in a smaller thickness than that in an existing battery pack.

DISCLOSURE

Technical Problem

The present invention has been made in an effort to solve a problem of the conventional art and a technical object that is requested from the past.

Specifically, the present invention has been made in an effort to provide a battery pack for a laptop computer that can satisfy requirements of a slim design of the laptop computer by forming a thickness of a contact point portion that contacts an upper case and lower case constituting a pack case that encloses battery cells and an external circumferential surface of the battery cells to be smaller than that of the remaining portions of the upper and lower cases and by attaching each sheet to an outer surface of a case corresponding to the contact point portion.

Technical Solution

An exemplary embodiment of the present invention provides a battery pack that is mounted to a laptop computer, wherein two or more battery cells that can be charged and discharged are housed in a pack case;

the battery cells are cylindrical battery cells having a circular vertical cross-section;

the pack case is configured with a lower case in which battery cells are received and an upper case that is coupled to the lower case in order to close and seal the battery cells;

in the upper case, a thickness of an upper contact point portion that contacts an upper end external circumferential surface of the battery cells is 70% or less of that of the remaining portions of the upper case, and a first sheet is attached to an outer surface of the upper case corresponding to the upper contact point portion; and in the lower case, a thickness of a lower contact point portion that contacts a lower end external circumferential surface of the battery cells is 70% or less of that of the remaining portions of the lower case, and a second sheet is attached to an outer surface of the lower case corresponding to the lower contact point portion.

When producing a case constituting a battery pack, a battery pack for a conventional laptop computer has a designated thickness for satisfying an appearance failure and thus there was a limitation in satisfying requirements of a slim laptop computer design.

Compared with such a conventional battery pack, in a battery pack according to the present invention, because each sheet is attached to an outer surface of upper and lower cases corresponding to contact point portions that contact upper and lower external circumferential surfaces of battery cells, the battery pack can be designed in a thickness smaller than that of an existing battery pack case and thus when using the battery pack of the present invention, a laptop computer of a more compact structure can be produced.

In an exemplary embodiment, the upper case and the lower case may be an injection molded article of a polymer resin. A kind of such a polymer resin is not particularly limited, and various materials may be used for a case of a battery pack for a conventional laptop computer.

Preferably, in the upper case, the upper contact point portion may be recessed upward in a shape corresponding to an upper end external circumferential surface of the battery cells.

Further, similar to the upper contact point portion of the upper case, in the lower case, the lower contact point portion may be recessed downward in a shape corresponding to a lower end external circumferential surface of the battery cells.

Such upward recess and downward recess structures enable battery cells to be further stably mounted at an internal space of the upper case and the lower case.

A recess depth may be appropriately determined according to a case thickness and an exterior diameter of a battery cell in a corresponding portion.

As described above, according to the present invention, similar to the upper contact point portion, because the second sheet is attached to an outer surface of the lower case, a thickness of the lower contact point portion that contacts the lower end external circumferential surface of battery cells is 70% or less of that of the remaining portions of the lower case.

In a detailed example, in the upper case, a thickness of the upper contact point portion may be 60% or less of that of the remaining portions of the upper case, and in the lower case, a thickness of the lower contact point portion may be 60% or less of that of the remaining portions of the lower case.

Because the upper contact point and the lower contact point of the battery cell may have a structure in which an uppermost end peak and/or a lowermost end peak thereof are exposed to the outside of the case, in a case thickness of the upper contact point portion and a case thickness of the lower contact point portion, lower limit values each may be 0%. That is, in some case, the upper contact point portion of the upper case may be opened such that a peak of the upper end external circumferential surface of the battery cells is exposed, and the lower contact point portion of the lower case may be opened such that a peak of the lower end external circumferential surface of the battery cells is exposed.

In a detailed example, thicknesses of the upper contact point portion of the upper case and the lower contact point portion of the lower case may be in a range of 0 to 0.7 mm.

An outer surface of the battery cell is enclosed with a tube of an insulation resin, but in order to secure more excellent safety through insulation, the first sheet and the second sheet may be made of a polymer resin having a VTM-0 flame retardant grade.

For example, the polymer resin may be polyethyleneterephthalate or polycarbonate, but is not limited thereto. In another exemplary embodiment, a metal plate may be additionally interposed between an outer surface of the lower case and the second sheet.

In such a structure, the metal plate may be made of, for example, stainless steel, but is not limited thereto.

A thickness of the metal plate may be in a range of 5% to 30% of that of the remaining portions of the lower case. Specifically, a thickness of the metal plate may be in a range of 10% to 25% of that of the remaining portions of the lower case and may be, more specifically, 12% to 22%.

When a thickness of the metal plate exceeds 30%, an entire lower case unpreferably has a large thickness, and when a thickness of the metal plate is less than 5%, more improved strength cannot be unpreferably guaranteed by additional interposition of the metal plate.

In some case, the lower contact point portion of the lower case may be opened such that a peak of the lower end external circumferential surface of the battery cells directly contacts a metal plate.

The metal plate may be coupled to, for example, the second sheet by an adhesive. However, a structure is available in which the second sheet and an external circumference of the lower case are directly bonded and in which the metal plate is included in an internal space thereof, and various application structures may be considered, and it is analyzed that the structures are included in the scope of the present invention.

An average thickness of the upper case and the lower case may be, for example, 0.6 to 2 mm.

The present invention further provides a laptop computer including the battery pack as a power source. A laptop computer using a battery pack that houses a plurality of rechargeable batteries is well known in the art and therefore in this specification, a detailed description thereof will be omitted.

MODE FOR INVENTION

Hereinafter, an exemplary embodiment of the present invention is described with reference to the drawings, but is provided for more easy understanding of the present invention, and the scope of the present invention is not limited thereto.

Figure 1:
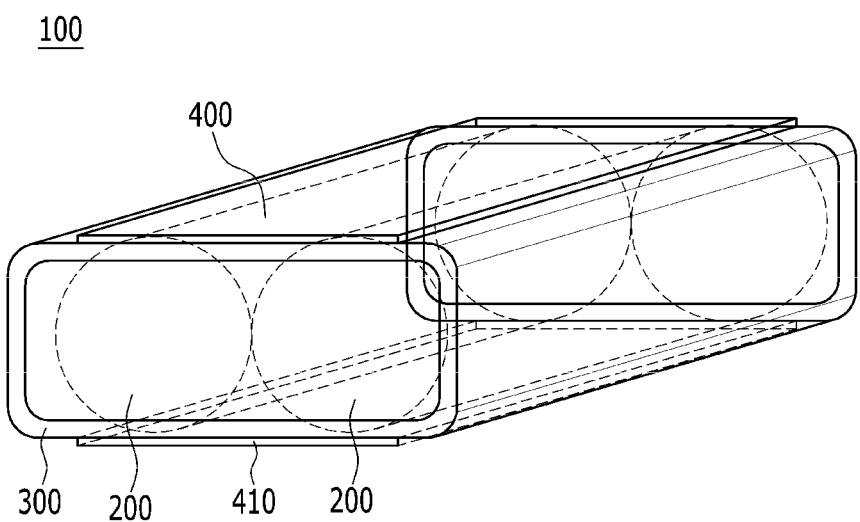
FIG. 1 is a perspective view illustrating a battery pack according to an exemplary embodiment of the present invention.
Figure 2:
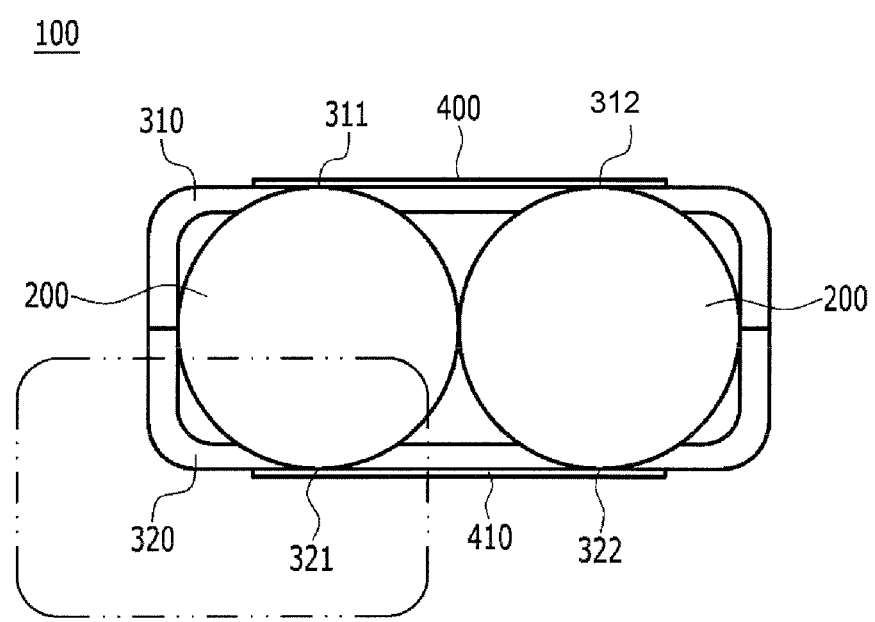
FIG. 2 is a partially vertical cross-sectional view of the battery pack of FIG. 1.

FIG. 1 is a perspective view illustrating a battery pack according to an exemplary embodiment of the present invention, and FIG. 2 is a vertical cross-sectional view of the battery pack of FIG. 1.

Referring to FIGS. 1 and 2, a battery pack 100 has a structure in which battery cells 200 are housed in a pack case 300.

The battery cells 200 have a cylindrical structure of a circular vertical cross-section.

The battery cell 200 is a cylindrical battery cell of a structure in which a positive electrode, a negative electrode, and an electrode assembly of a separation membrane structure that is interposed between the positive electrode and the negative electrode are received in a battery case that is formed in a cylindrical metal can together with an electrolyte solution.

The pack case 300 has a structure in which an upper case 310 and a lower case 320 are mutually coupled, in the pack case 300, the battery cells 200 are housed, and the pack case 300 includes upper contact point portions 311 and 312 and lower contact point portions 321 and 322.

In a portion corresponding to the upper contact point portions 311 and 312 and the lower contact point portions 321 and 322, a first sheet 400 and a second sheet 410 are attached to outer surfaces of the upper case 310 and the lower case 320, respectively.

The upper case 310 and the lower case 320 are formed with an injection molded article of a polymer resin.

The upper contact point portions 311 and 312 that contact an upper end external circumferential surface of the battery cells 200 and the upper case 310 are recessed upward in a shape corresponding to an upper end external circumferential surface of the battery cells 200, and the lower contact point portions 321 and 322 that contact a lower end external circumferential surface of the battery cells 200 and the lower case 320 are recessed downward in a shape corresponding to a lower end external circumferential surface of the battery cells 200.

The first sheet 400 and the second sheet 410 are made of a polymer resin satisfying a UL-94 VTM-0 flame retardant grade, and such a polymer resin may be polyethylene-terephthalate or polycarbonate.

Figure 3:
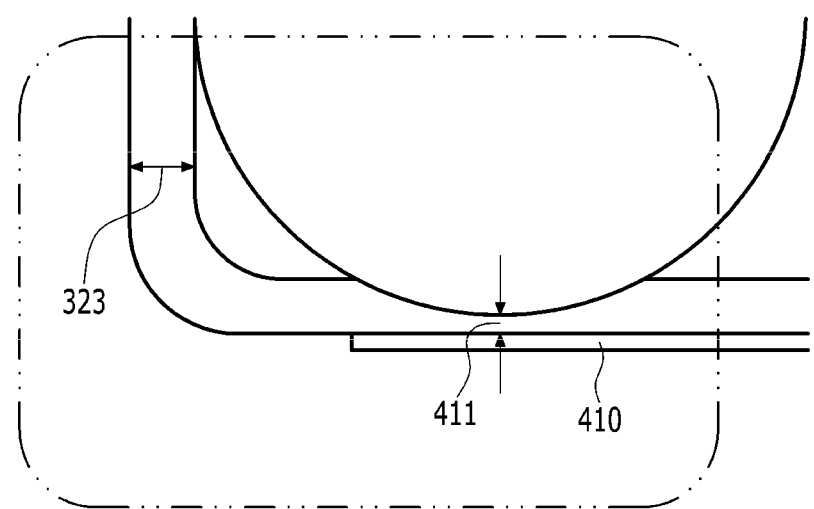
FIG. 3 is an enlarged view of a second sheet portion that is attached to a lower case.
Figure 4:
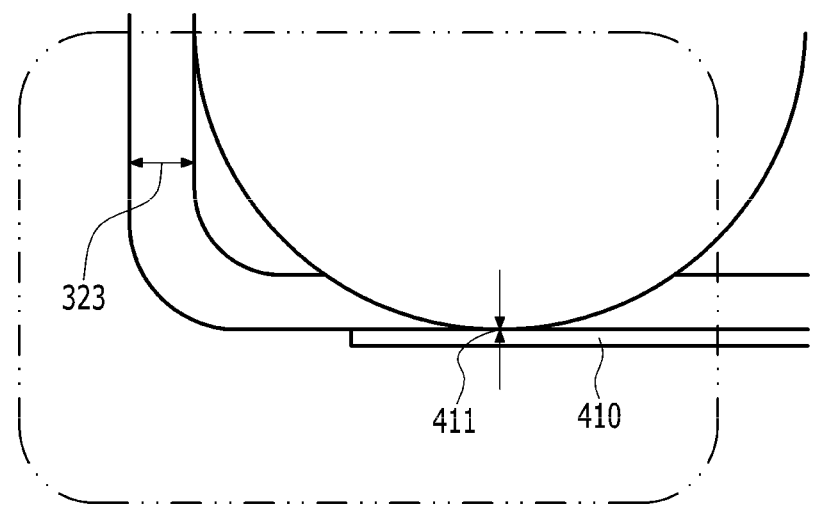
FIG. 4 is an exemplary variation of FIG. 3 and is an enlarged view of a second sheet portion that is attached to a lower case.

FIG. 3 is an enlarged view of a thickness of the lower case and the second sheet of FIG. 2.

Referring to FIG. 3, in the lower case 320, a thickness 411 of the lower contact point portion 321 is 70% or less of a thickness 323 of the remaining portions of the lower case and has a range of, for example, 0 to 0.7 mm.

Figure 5:
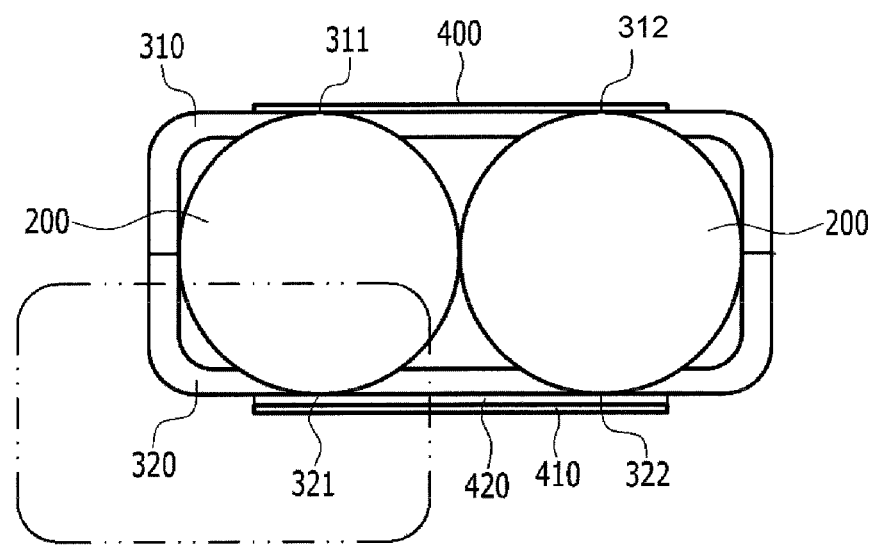
FIG. 5 is a partially vertical cross-sectional view of a battery pack according to another exemplary embodiment of the present invention.
Figure 6:
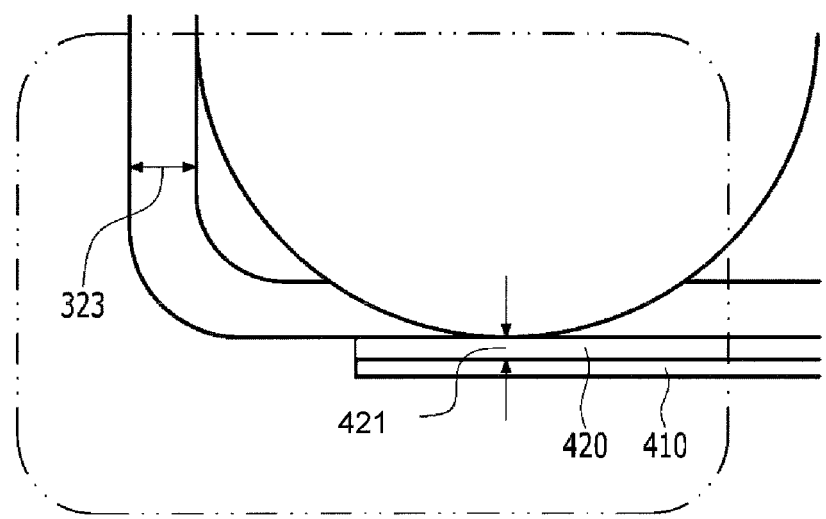
FIG. 6 is an enlarged view of a metal plate and a second sheet portion that are attached to a lower case.

FIG. 5 is a partially vertical cross-sectional view of a battery pack according to another exemplary embodiment of the present invention, and FIG. 6 is an enlarged view of a lower case and a second sheet 410 and a metal plate 420 that are attached to the lower case.

Referring to FIG. 5, the metal plate 420 that is coupled by an adhesive is interposed between an outer surface of the lower case 320 and the second sheet 410, and in the lower case 320, the lower contact point portions 321 and 322 are opened and thus a peak of a lower end external circumferential surface of the battery cells 200 directly contacts the metal plate 420.

Referring to FIG. 6, the metal plate 420 is made of stainless steel, and a thickness 421 of the metal plate is in a range of 5% to 30% of a thickness 323 of the remaining portions of the lower case 320.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

As described above, because a battery pack according to the present invention can produce each of upper and lower cases in a thin thickness by a specific configuration, a laptop computer of a more slim design can be designed.

The invention claimed is:

1. A battery pack that is mounted to a laptop computer, the battery pack including:
a pack case; and
battery cells configured to be charged and discharged, wherein the battery cells are housed in the pack case,
wherein the battery cells are cylindrical battery cells having a circular vertical cross-section in which a positive electrode, a negative electrode, and an electrode assembly of a separation membrane structure that is interposed between the positive electrode and the negative electrode are received in a battery case that is formed in a cylindrical metal can together with an electrolyte solution,
wherein the pack case includes:
a lower case in which the battery cells are received; and
an upper case coupled to the lower case in order to close and seal the battery cells,
the upper and lower cases forming a closed cross-section,
wherein the upper case includes an upper contact point portion, at least a first portion of the upper contact point portion contacting an upper end external circumferential surface of the battery cells,
wherein the lower case includes a lower contact point portion, at least a first portion of the lower contact point portion contacting a lower end external circumferential surface of the battery cells,
wherein an entirety of the upper case, excluding the upper contact point portion, has a substantially uniform thickness,
wherein an entirety of the lower case, excluding the lower contact point portion, has a substantially uniform thickness,
wherein in the upper case, a thickness of the first portion of the upper contact point portion that contacts the upper end external circumferential surface of the battery cells is 70% or less than a thickness of remaining portions of the upper case, and a first sheet is attached to an outer surface of the upper case corresponding to the upper contact point portion,
wherein in the lower case, a thickness of the first portion of the lower contact point portion that contacts the lower end external circumferential surface of the battery cells is 70% or less than a thickness of remaining portions of the lower case, and a second sheet is attached to an outer surface of the lower case corresponding to the lower contact point portion,
wherein a metal plate is interposed between the outer surface of the lower case and the second sheet such that the metal plate is on an outermost portion of the outer surface of the lower case, and
wherein the lower case is exactly opened in the lower contact point portion such that only a peak of the lower end external circumferential surface of the battery cells directly contacts the metal plate.

2. The battery pack of claim 1, wherein in the upper case, the upper contact point portion is recessed upward in a shape corresponding to the upper end external circumferential surface of the battery cells.

3. The battery pack of claim 1, wherein in the upper case, a second portion of the upper contact point portion is opened such that a peak of the upper end external circumferential surface of battery cells is exposed.

4. The battery pack of claim 1, wherein in the lower case, the lower contact point portion is recessed downward in a shape corresponding to the lower end external circumferential surface of the battery cells.

5. The battery pack of claim 1, wherein in the lower case, a second portion of the lower contact point portion is opened such that the peak of the lower end external circumferential surface of battery cells is exposed.

6. The battery pack of claim 1, wherein the upper case and the lower case are injection molded articles of a polymer resin.

7. The battery pack of claim 1, wherein an average thickness of the upper case and the lower case is 0.6 to 2 mm.

8. The battery pack of claim 1, wherein the upper and lower cases form a rectangular shape along a vertical cross-section.

9. The battery pack of claim 1, wherein the thicknesses of the upper contact point portion in the upper case and the lower contact point portion in the lower case are greater than 0 mm and equal to or less than 0.7 mm.

10. The battery pack of claim 1, wherein in the upper case, the thickness of the first portion of the upper contact point portion is 60% or less than the thickness of the remaining portions of the upper case, and in the lower case, the thickness of the first portion of the lower contact point portion is 60% or less than the thickness the remaining portions of the lower case.

11. The battery pack of claim 1, wherein the metal plate is made of stainless steel.

12. The battery pack of claim 1, wherein the metal plate is coupled to the second sheet by an adhesive.

13. The battery pack of claim 1, wherein a thickness of the metal plate is in a range of 15% to 25% of the thickness of the remaining portions of the lower case.

14. The battery pack of claim 1, wherein a thickness of the metal plate is in a range of about 30% of the thickness of the remaining portions of the lower case.

15. The battery pack of claim 1, wherein the first sheet and the second sheet is made of a polymer resin having a VTM-0 flame retardant grade, and
wherein the polymer resin is polyethyleneterephthalate or polycarbonate.

16. A laptop computer comprising a battery pack as a power source, the battery pack including:
a pack case; and
two or more battery cells configured to be charged and discharged, wherein the battery cells are housed in the pack case,
wherein the battery cells are cylindrical battery cells having a circular vertical cross-section structure in which a positive electrode, a negative electrode, and an electrode assembly of a separation membrane structure that is interposed between the positive electrode and the negative electrode are received in a battery case that is formed in a cylindrical metal can together with an electrolyte solution,
wherein the pack case includes:
a lower case in which battery cells are received; and
an upper case that is coupled to the lower case in order to close and seal the battery cells,
the upper and lower cases forming a closed cross-section,
wherein the upper case includes an upper contact point portion, wherein at least a first portion of the upper contact point portion contacts an upper end external circumferential surface of the battery cells,
wherein the lower case includes a lower contact point portion, wherein at least a first portion of the lower contact point portion contacts a lower end external circumferential surface of the battery cells,
wherein an entirety of the upper case, excluding the upper contact point portion, has a substantially uniform thickness,
wherein an entirety of the lower case, excluding the lower contact point portion, has a substantially uniform thickness,
wherein in the upper case, a thickness of the first portion of the upper contact point portion that contacts the upper end external circumferential surface of the battery cells is 70% or less than a thickness of remaining portions of the upper case, and a first sheet is attached to an outer surface of the upper case corresponding to the upper contact point portion,
wherein in the lower case, a thickness of the first portion of the lower contact point portion that contacts the lower end external circumferential surface of the battery cells is 70% or less than a thickness of remaining portions of the lower case, and a second sheet is attached to an outer surface of the lower case corresponding to the lower contact point portion,
wherein a metal plate is interposed between the outer surface of the lower case and the second sheet such that the metal plate is on an outermost portion of the outer surface of the lower case, and
wherein the lower case is exactly opened in the lower contact point portion such that only a peak of the lower end external circumferential surface of the battery cells directly contacts the metal plate.

17. A battery pack that is mounted to a laptop computer, the battery pack including:
a pack case; and
battery cells housed in the pack case, wherein the battery cells are cylindrical battery cells having a circular vertical cross-section structure in which a positive electrode, a negative electrode, and an electrode assembly of a separation membrane structure that is interposed between the positive electrode and the negative electrode are received in a battery case that is formed in a cylindrical metal can together with an electrolyte solution,
wherein the pack case includes:
a lower case in which battery cells are received; and
an upper case that is coupled to the lower case in order to close and seal the battery cells,
the upper and lower cases forming a closed cross-section,
wherein the upper case includes an upper contact point portion, wherein at least a first portion of the upper contact point portion contacts an upper end external circumferential surface of the battery cells,
wherein the lower case includes a lower contact point portion, wherein at least a first portion of the lower contact point portion contacts a lower end external circumferential surface of the battery cells,
wherein an entirety of the upper case, excluding the upper contact point portion, has a substantially uniform thickness,
wherein an entirety of the lower case, excluding the lower contact point portion, has a substantially uniform thickness,
wherein the upper contact point portion and the lower contact point portion do not contact an entire external circumferential surface of the battery cells,
wherein remaining portions of the lower case have the substantially uniform thickness between adjacent battery cells of the battery cells,
wherein a metal plate is interposed between an outer surface of the lower case and the second sheet such that the metal plate is on an outermost portion of the outer surface of the lower case, and
wherein the lower case is exactly opened in the lower contact point portion such that only a peak of the lower end external circumferential surface of the battery cells directly contacts the metal plate.

18. The battery pack of claim 17, wherein the upper and lower cases form a rectangular shape along a vertical cross-section.

19. The battery pack of claim 17,
wherein in the upper case, a thickness of the first portion of the upper contact point portion that contacts the upper end external circumferential surface of the battery cells is less than a thickness of remaining portions of the upper case, and a first sheet is attached to an outer surface of the upper case corresponding to the upper contact point portion, and
wherein in the lower case, a thickness of the first portion of the lower contact point portion that contacts the lower end external circumferential surface of the battery cells is less than the substantially uniform thickness of the remaining portions of the lower case, and a second sheet is attached to the outer surface of the lower case corresponding to the lower contact point portion.

\* \* \* \* \*